United States Patent [19]

Herzog

[11] Patent Number: 4,709,798
[45] Date of Patent: Dec. 1, 1987

[54] ROTARY FEEDER TO ORIENT AND FEED BOTTLE CAPS AND SIMILAR PARTS

[76] Inventor: Michael Herzog, 135 Industrial Blvd., Riverhead, N.Y. 11901

[21] Appl. No.: 28,044

[22] Filed: Mar. 20, 1987

Related U.S. Application Data

[63] Continuation of Ser. No. 708,074, Mar. 4, 1985, abandoned.

[51] Int. Cl.⁴ ............................................. B23G 7/12
[52] U.S. Cl. ................................... 198/380; 198/392; 209/644; 209/919; 209/928; 221/157
[58] Field of Search ............... 209/644, 656, 658, 915, 209/919, 928; 198/380, 392, 398; 221/157, 159, 156

[56] References Cited

U.S. PATENT DOCUMENTS

| | | | |
|---|---|---|---|
| 2,744,612 | 5/1956 | Kay et al. | 198/392 |
| 3,150,762 | 9/1964 | Tricinci | 198/380 |
| 3,341,031 | 9/1967 | Myers | 198/380 |
| 3,599,829 | 8/1971 | Aidlin | 198/380 |
| 3,726,385 | 4/1973 | Sterling | 198/398 |
| 3,826,405 | 7/1974 | Hoppman et al. | 198/392 |
| 4,535,893 | 8/1985 | Bühren | 209/920 |

Primary Examiner—Robert B. Reeves
Assistant Examiner—Donald T. Hajec
Attorney, Agent, or Firm—Hopgood, Calimafde, Kalil, Blaustein & Judlowe

[57] ABSTRACT

A rotary feeder for articles is provided and consists of a rotating bowl that has a domed floor and an upper ledge, an inclined stationary ramp that will carry the articles from the domed floor to the upper ledge, a stationary guide ring that has an exit port and a device for rejecting improper positioned articles before the articles are discharged from the exit ramp of the guide ring, the device including an air jet positioned radially inward from the pathway provided by the ledge and oriented to direct an air jet angled downward and radially outward toward both said ledge and the stationery guide ring or wall structure whereby crown side up caps are blown off said ledge back into said bowl and cavity side up caps are retained on the ledge and passed on to the exit port.

4 Claims, 9 Drawing Figures

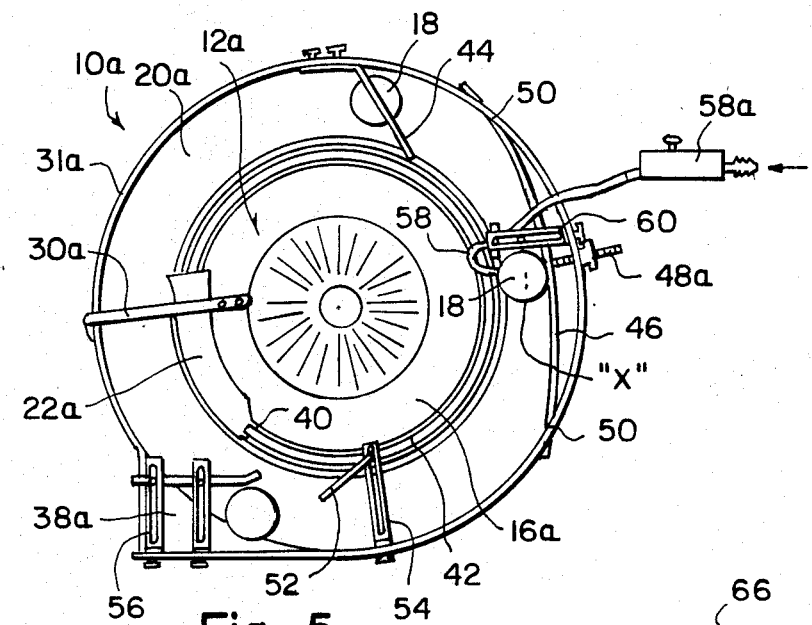
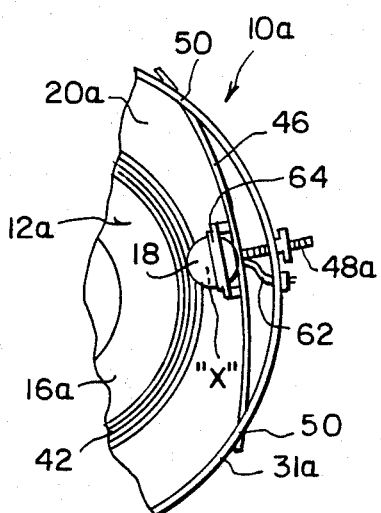
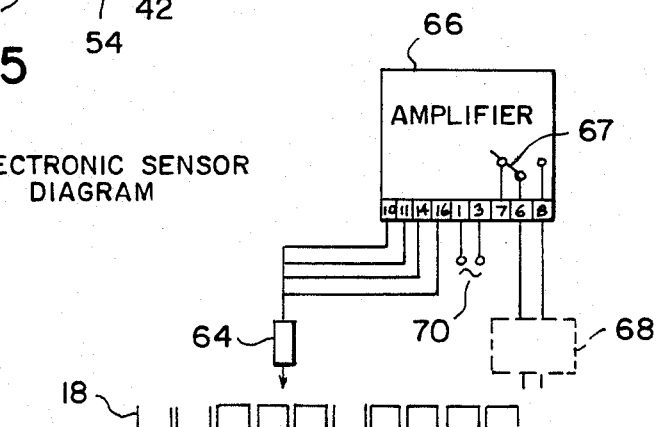
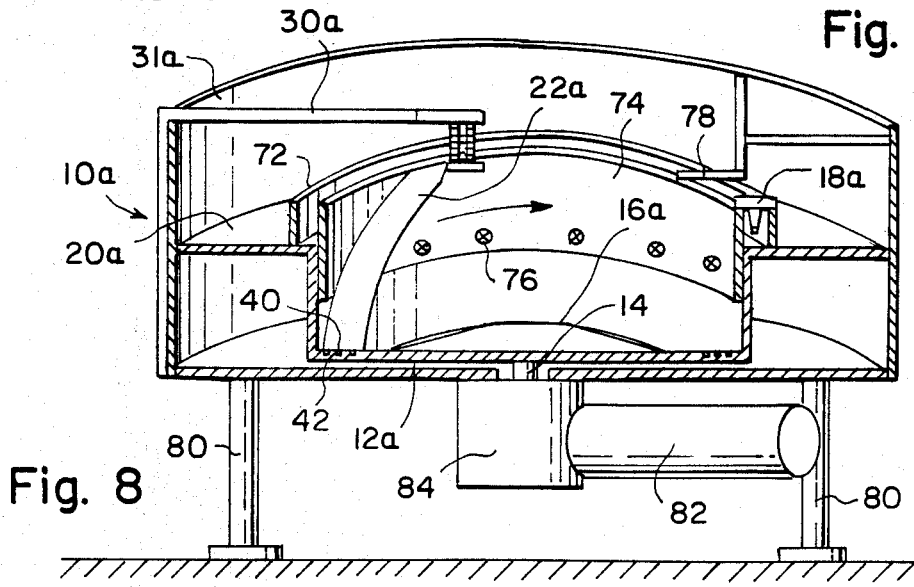
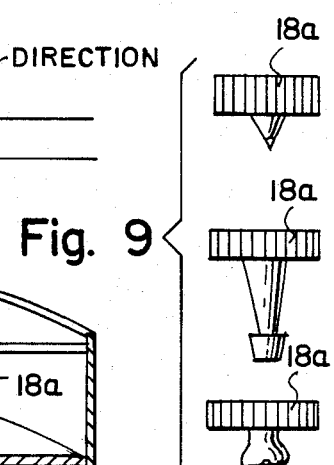

4,709,798

ROTARY FEEDER TO ORIENT AND FEED BOTTLE CAPS AND SIMILAR PARTS

This application is continuation, of application Ser. No. 708,074, filed Mar. 4, 1985, now abandoned.

BACKGROUND OF THE INVENTION

The instant invention relates generally to article feeding apparatuses and more specifically it relates to a rotary feeder for articles such as bottle caps.

Numerous apparatuses have been provided in prior art that are adapted to feed articles therethrough. For example, U.S. Pat. Nos. 3,065,841; 3,285,387; 3,338,372; 3,599,829; 3,669,260; 3,826,405; 3,831,734; 3,900,107; 3,912,120; 4,006,812; 4,093,062 and 4,092,412 all are illustrative of such prior art. While these units may be suitable for the particular purpose to which they address, they would not be as suitable for the purpose of the present invention, as heretofore described.

SUMMARY OF THE INVENTION

A principle object of the present invention is to provide a rotary feeder for articles that will feed only properly positioned articles to a remote location of use.

Another object is to provide a rotary feeder for articles that can be adjusted to accommodate articles of various sizes and shapes.

An additional object is to provide a rotary feeder for articles that will prevent jam-up of the articles so that the feeder will require a minimum of care and attention.

A further object is to provide a rotary feeder for articles that is economical in cost to manufacture.

A still further object is to provide a rotary feeder for articles that is simple and easily, and fully adjustable.

A still additional further object is to provide a rotary feeder for bottle caps and similar parts that has a minimum of production down time since they are adjusted rapidly simply by turning one or two knobs and the discharge bracket chute assembly.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 5 is a top plan view of a second form of the invention showing the air jet rejector.

FIG. 6 is a top plan view or another modification with parts broken away showing an electronic sensor in combination with an air jet rejector.

FIG. 7 is a diagrammatic view of the operation of the electronic sensor.

FIG. 8 is a perspective view in cross section of a third form of the invention adapted for spout caps.

FIG. 9 is an elevational view of three different types of spout caps that can be used in FIG. 8.

DETAILED DESCRIPTION OF THE PREFERRED EMBODIMENTS

Figure 4:
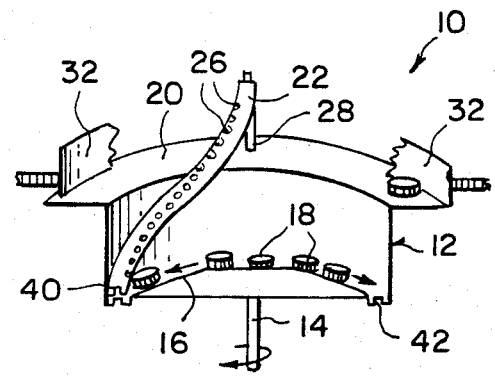
FIG. 4 is a diagrammatic perspective view in cross section of the bowl with parts broken away.

Turning now descriptively to the drawings, in which similar reference characters denote similar elements throughout the several views, FIGS. 1 through 4 illustrates a rotary feeder 10 that includes a round bowl 12, spinning clockwise on a vertically mounted shaft or axis 14. The bottom of the bowl is a domed floor 16, raised at the center on axis 14 and descending radially outwardly from said axis as best seen in FIG. 4, such that articles, in this case bottle caps 18 having an external crown side and an internal cavity side bordered by a peripheral skirt, when dumped into the bowl, slide to the outside perimeter of the bowl. The caps 18 are dumped into the center of the rotating bowl 12 from a cap supply hopper (not shown) above the feeder 10. The caps 18 will be delivered to the bowl 12 on demand only and this will be determined by a switch (not shown) that is inserted into the bowl and is physically or photo electrically in contact with the caps being oriented. Once the caps 18 are in the inside of the bowl 12 they will be forced by centrifugal force, back pressure, and gravity to the outside perimeter of the bowl.

Figure 1:
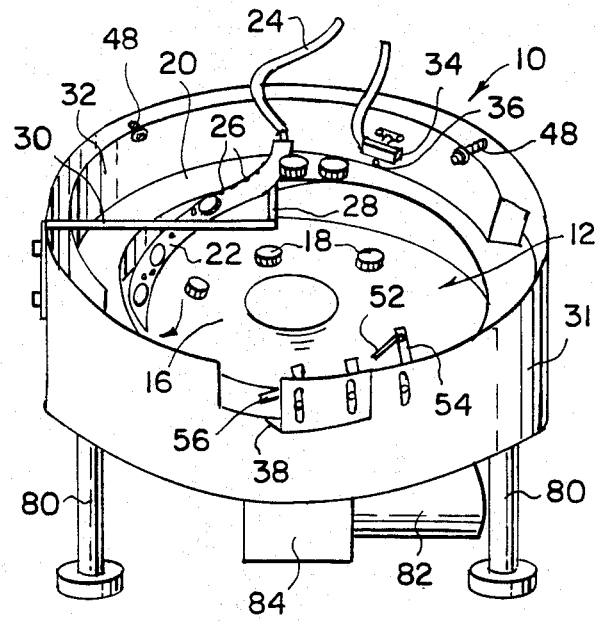
FIG. 1 is a perspective view of a first form of the invention showing the caps sliding up the stationary ramp onto the upper ledge of the bowl.
Figure 2:
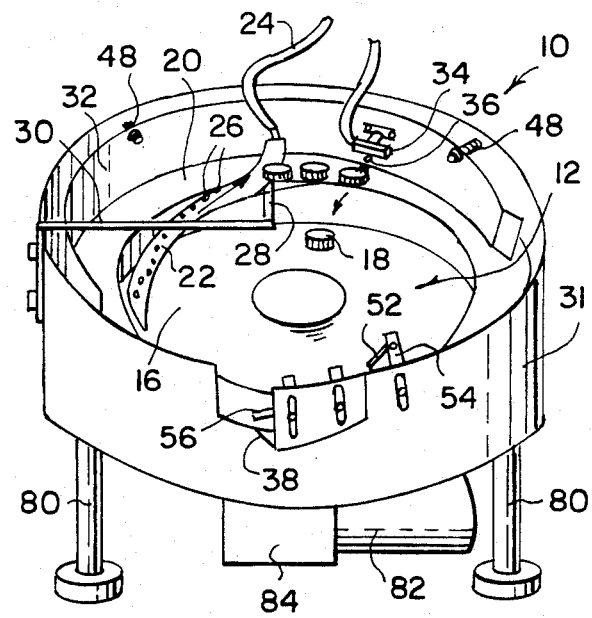
FIG. 2 is a perspective view thereof showing an air jet pushing bad (open side down) caps back into the bowl.
Figure 3:
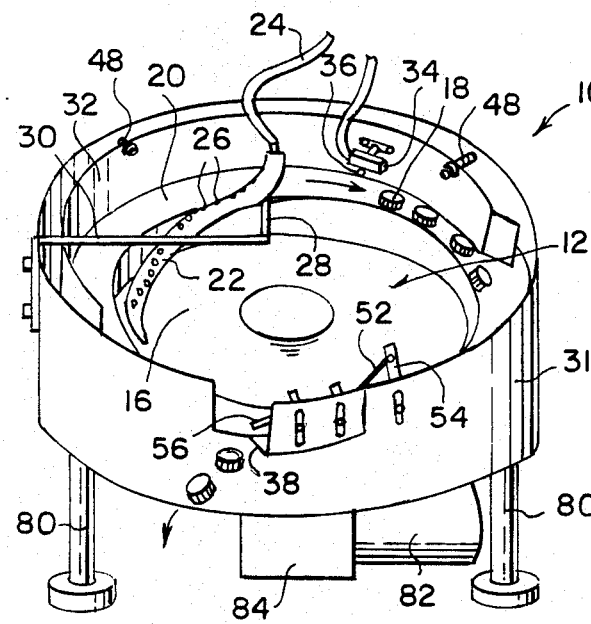
FIG. 3 is a perspective view thereof showing the caps discharged from the exit ramp.

FIG. 1 shows how the caps 18 are forced onto an upper annular ledge 20 of the bowl 12 by sliding up an inclined stationary ramp 22 from a lower ramp end approximately five or six inches to the upper ledge. The ramp 22 is a tube or can be a flat plane 22a as seen in FIG. 5. Attached to the top or upper end of the ramp is an air line 24. The air escapes through a series of air jets 26 which are arranged in a spiral fashion such that the caps 18 are pushed up the ramp so that the caps are flipped over allowing for the majority of the caps to be in the good open side up, i.e., crown side down, position. The ramp 22 has a mounting post 28 attached to a ramp support bracket 30 which goes half way across the upper end of a stationary housing 31. Support bracket 30 is bolted to the side of housing 31 by two bolts for rigidity.

There is an adjustable guide ring 32 around approximately half of the perimeter of the upper ledge 20 of the rotary bowl 12 such that the cap diameters can be presented to lay flatly on the upper ledge and is supported by only one or two screws 48 for easy adjustment. This guide ring 32, in the form of a stationary but adjustable substantially vertical wall serves only as a leaning wall and has no mechanical function other than to keep the caps being thrust against it by centrifugal force in a single file and is to be adjusted depending upon cap diameters. The drive shaft 14 is driven by a variable D.C. motor 82 and gear box 84. This variable speed input is used for different stylings of caps such that each style of cap has its optimum performance speed.

Cap discrimination is assisted with the use of a proximity switch 34 which is mounted on the guide ring 32 just above the caps being oriented. This proximity switch 34 senses the caps 18 as to whether they are open or internal cavity side up or open side down. If the cap is open side up, external crown side down, it will be sensed by the proximity switch 34 as a good cap and it will be allowed to pass without being rejected. If, however, the cap is open side down, crown side up, when it passes under the proximity switch, it will be sensed as a bad cap and a momentary air burst from an air jet 36 located below the proximity switch 34 will reject the cap by pushing it back into the bowl 12. These good caps on the upper ledge 20 will then proceed in a clockwise direction, until they are discharged from an exit ramp 38 disposed adjacent the ledge 20 circumferentially downstream where they will be used for a future process (see FIG. 3).

FIG. 5 shows a first modified rotary feeder 10a. The caps 18 are dumped into the center of a bowl 12a in the same manner as in feeder 10. The caps are spun to the outside edge of the clockwise rotating bowl and are facilitated by a domed floor 16a which helps to push them to the edge. Once they are at the periphery of the bowl, they are pushed up the ramp 22a. The ramps 22 and 22a both have fingers 40 at the lower ramp end which fit into grooves 42 on the domed floors 16 and 16a; so as to give a continuous smooth surface for the caps to climb up the ramp.

The ramp 22a like 22, is supported by a ramp support bracket 30a, and does not rotate with the bowl but is rather fixed to a stationary housing 31a of the feeder 10a. Thus, the lower end of the ramp scoops up the caps as the caps travel with the rotating bowl. The ramp 22a can be changed in varying widths to accommodate wider or narrower caps. The bracket 30a is only a partial bracket as shown in FIG. 5 and allows for ample clearance for the caps 18 being dumped in. Once the caps are sent up the ramp 22a the top of the ramp has a slight twist that will push and turn the caps onto an upper ledge 20a and can either use air assist as in ramp 22 or only by back pressure from the other caps in the feeder pushing up the ramp. They move from the ramp along the upper ledge to an adjustable wiper bar 44 where all the stacked up caps are pushed back into the bowl with only one level of caps permitted to pass the point of the wiper bar 44. From here, they continue circumferentially downstream to a spring steel ledge width selector 46, a part of the stationary wall, which is adjusted with a screw 48a. It is made of a spring steel metal so that when the adjusting screw 48a for the ledge width selector is turned, it will increase or decrease the width of the upper ledge 20a the cap 18 is riding on. An adjustment can be made from a 13 mm diameter cap to a 70 mm diameter cap or more depending on the width of the upper ledge 20a. The width of this ledge is important because at the point of where the adjusting screw 48a for the ledge width selector is, the caps are selected. This selection is accomplished in several ways that will be discussed later.

In addition, the spring steel ledge width selector 46 is inserted at two points 50, 50 through the housing 31a of the feeder 10a which keeps the spring steel ledge width selector 46 levels flat and at a positive position at all times. After the caps have been selected at or about point "X" only the caps that are open side up still remain on the upper ledge 20a with the caps continuing circumferentially downstream in a clockwise fashion to an adjustable exit wiper 52. This wiper is made adjustable by a support bracket 54 mounted on the housing 31a of the feeder 10a. Its function is to push the cap 18 that is now hanging over the edge of the upper ledge 20a of the bowl 12a back against the housing 31a of the feeder 10a so that it may exit on an exit ramp 38a, while at the same time being guided by a discharge bracket assembly 56.

The majority of flat cap styles are preferably selected by the use of a single air jet 58 placed over the point "X" so that all selections of upside down or open side up caps is done at or near point "X". This air jet 58 is mounted on a slotted bracket 60 and can be adjusted both horizontally and vertically by the bracket. It is adjusted sideways by actually directing the air jet 58 onto the cap. The principle of how the air jet works is simple. Once the cap 18 is positioned on the upper ledge 20a so that it is hanging over the upper ledge, the air jet 58, being directed radially outwardly, will actually push the open side up cap against the outside wall of the spring steel ledge width selector 46, part of the stationary vertical wall structure, and prevents it from falling back into the bowl 12a. However, if the cap is upside down, the same air jet 58 will work in a different fashion. It will actually push down on the external crown side edge of the cap 18 that is closest to the center of the bowl which will cause it to fall back into the bowl. Once they have passed the air jet 58 only the open side up caps 18 will remain and be discharged in the fashion described earlier. In addition, the pressure of air applied to this cap is critical and needs to be adjusted depending upon the weight and size of the cap. This air pressure is adjusted with the use of a simple valve 58a.

In cases not shown where the caps are not flat, two of these air jets 58 are used side by side. The first air jet is used to reject the caps that are laying on their side and these caps are pushed by air and roll off the upper ledge 20a and pushed back into the bowl 12a. After the first air jet, only the caps that will remain are the caps that are open side up or open side down, and these caps will be selected for the same as a typical flat cap described above.

In FIG. 6 the selection is done at point "X" by using both an air jet 62 and a photo electric sensor 64. The sensor 64 is mounted on the spring steel width selector 46 directly above the cap. The air jet 62 is placed behind the spring steel ledge width selector 46 being directed through a hole in the spring steel width selector. There the proximity switch sensor 64 will determine if the cap is open side up or open side down. If it is open side up, the sensor 64 will allow for the cap 18 to pass by and not switch on the air jet 62 as shown in FIG. 7. However, if the cap is open side down, once it is under the sensor, the air jet 62 will be activated and will push the cap to be rejected back into the bowl 12a.

This rejection can be accomplished by air physically pushing the cap 18 back into the bowl 12a or by a small piston of an ejector solenoid (not shown) pushing the cap back into the bowl, since both work satisfactorily. The schematic drawing for this control is shown in detail in FIG. 7. Amplifier 66 is set on low amplification for dark-on operation. When the sensor 64 does not "see" the cap 18, the amplifier 66 will activate the air jet 62 of ejector solenoid by a switch 67. A time delay relay 68 can be added to shut off the air jet or ejector solenoid when no cap is detected after a predetermined amount of time. The distance between the top of the cap 18 and the sensor 64 should be one half to one inch. The lower the profile of the cap, the closer the sensor should be with decreased sensitivity. A 8 OmA transistor output 70 could be used in place of the relay 68 to control the air jet or ejector solenoid for longer operating life. The replacement of the electronic sensor 64 with a pneumatic sensor (not shown) may also be used with equal success.

FIG. 5 shows that for a flat cap 18 one air jet 58 can be used to discriminate open side up and open side down caps. For a cap that is either tall or "square" two air jets 58, 58 side by side will be required as mentioned earlier. A "square" cap is one where the diameter and the width are identical or nearly identical, and therefore, both good open side up, bad open side down and caps on their sides will be kept on the ledge 20a after passing adjustable wiper bar 44.

The above system of discrimination cannot be applied to certain caps 18a that have a spout, snip top, pushpull, or any other protrusion, as shown in FIG. 9. In FIG. 8 these caps 18a are oriented such that they hang from two rings 72 and 74. Again, they are dumped into the center of the bowl 12a as any other type of cap. They are pushed up the ramp 22a and lay on these rings 72 and 74. These two rings are installed by screws 76 into the feeder 10a described earlier, and can be removed when standard caps are to be oriented. Once the caps 18a are laying between the inner and outer rings 72 and 74, they will not fall out, thus they pendulate between the rings. A rejecting wiper 78 will push them off, and back into the bowl before exiting, if they are not pendulating (hanging protrusion pointed down).

In addition, the entire feeder 10 or 10a rests on four adjustable support legs 80. The bowl 12 and 12a are driven by a ¼ HP D.C. motor 82 with an electronic variable speed controller (not shown) reduced with a right angle reducer (gear box) 84. The need for any pulleys, sprockets, belts or chains are not required. By turning a knob (not shown) on the controller, the rpm's of the feeders 10 and 10a will increase or decrease. For most applications the speed is not very critical, but generally the greater the rpm's of the bowl 12a, the faster the caps 18a will be oriented and discharged.

In addition so that the rotary feeder may run continuously even when caps or parts are not required to be discharged due to an excess of parts being oriented, an air jet can be successfully mounted on the housing 31a just prior to the adjustable exit wiper 52. The air jet is operated by a solenoid switch, such as those manufactured by ASCO, that will upon receiving a signal from an electric eye mounted in a discharge chute (not shown) cause a blast of air to push all caps about to exit back into the feeder bowl 12a. When the discharge chute, after the exit of the caps, is again open the electric eye will then shut off the air jet and allow for more caps to be discharged.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A rotary feeder for closure cap which caps have an external crown side and an internal cavity side bordered by a peripheral skirt, said feeder comprising in combination: a bowl, means mounting said bowl for rotation about a vertical axis, said bowl having a floor raised at the center on said axis and descending radially outward from said axis, and an annular ledge concentric with said axis and positioned above said floor; a stationary substantially vertical wall structure surrounding said ledge; a stationary ramp mounted within said bowl near the radially outer boundary of said bowl and having a lower ramp end for scooping up caps from said bowl and having an upper ramp end positioned alongside said ledge for depositing caps on said ledge for transport circumferentially about said axis with bowl rotation; said stationary wall structure being disposed for retaining said caps on said ledge in the presence of centrifugal force; first means disposed adjacent said ledge circumferentially downstream from said upper ramp end of said ramp for establishing a single level single file array of said caps around and on said ledge by returning to said bowl those caps on said ledge in excess of said single level single file array, said array consisting of caps with arbitrary orientation with regard to side up and side down; side stationary wall structure including circumferentially downstream of said first means an exit opening adjacent said ledge through which caps on said ledge reaching said exit opening are discharged; and second means mounted over said ledge between said first means and said exit opening for removing from said ledge and returning to said bowl any cap that is oriented crown side up, said second means including a portion of said stationary wall structure positioned to constrict the pathway immediately above said ledge so that caps passing said second means wall portion will be caused to overhang said ledge above said bowl, an air nozzle positioned above said ledge radially inward from said pathway constricting wall portion oriented to direct an air jet angled downward and radially outward toward both said ledge and said stationary wall structure, and means for feeding said nozzle with an adjustable air supply to produce an air jet whereby crown side up caps passing said second means blown off said ledge back into said bowl while the skirts of cavity side up caps are encountered by said air jet for urging said caps radially outward against said stationary wall structure to keep said cavity up caps on said ledge.

2. A rotary feeder according to claim 1, wherein said first means comprise an adjustable wiper bar mounted above said ledge and positionable at a distance above said ledge equal to slightly more than the height of a single cap.

3. A rotary feeder according to claim 1, wherein said second means stationary wall portion comprises a flexible wall member extending between circumferentially spaced points on said stationary wall on opposite sides of said second means with means for adjustably positioning a midpoint of said flexible wall member in a radial direction to provide an adjustment for said pathway constriction.

4. A rotary feeder according to claim 3, wherein said first means comprise an adjustable wiper bar mounted above said ledge and positionable at a distance above said ledge equal to slightly more than the height of a single cap.

* * * * *